United States Patent [19]

Valenti, Jr.

[11] Patent Number: 5,263,278

[45] Date of Patent: Nov. 23, 1993

[54] PLANT STEM PROTECTOR APPARATUS

[76] Inventor: Joseph A. Valenti, Jr., 105 Klondike Ave., Stamford, Conn. 06907

[21] Appl. No.: 905,447

[22] Filed: Jun. 29, 1992

[51] Int. Cl.⁵ ............................................. A01G 29/00
[52] U.S. Cl. ........................................ 47/48.5; 47/30
[58] Field of Search ................... 47/48.5, 59, 62, 79, 47/23–25, 26, 27, 44, 45, 30; 24/67.5, 67.9

[56] References Cited

U.S. PATENT DOCUMENTS

| | | | |
|---|---|---|---|
| 1,244,576 | 10/1917 | Arnold | 47/27 |
| 1,283,798 | 11/1918 | Kent | 47/45 |
| 2,782,561 | 2/1957 | Smith | 47/25 |
| 3,826,040 | 7/1974 | Roberts et al. | 47/25 |
| 3,876,146 | 4/1975 | Pacheco | 47/48.5 |
| 4,268,992 | 5/1981 | Scharf, Sr. | 47/48.5 |
| 4,336,666 | 6/1982 | Caso | 47/48.5 |
| 4,845,889 | 7/1989 | Taylor | 47/25 |
| 4,922,653 | 5/1990 | Stone | 47/45 |

FOREIGN PATENT DOCUMENTS 1058094 2/1967 United Kingdom ................ 24/67.5

Primary Examiner—Terry Lee Melius
Assistant Examiner—Joanne C. Downs
Attorney, Agent, or Firm—Leon Gilden

[57] ABSTRACT

A plant stem protector includes a tubular sleeve having a slit arranged parallel relative to an axis of the tubular sleeve, with the tubular sleeve further including first and second radial flanges projecting exteriorly of the sleeve fixedly mounted thereto to permit compress of flanges towards one another to effect opening of the sleeve to permit a plant stem to be directed through the slit. A modification of the invention includes the sleeve having feed tubes mounted parallel relative to the axis of the slit to cooperate with a reservoir fluid fill structure to permit selective feeding of each plant relative to the stem structure of each plant when positioned within the sleeve structure.

2 Claims, 5 Drawing Sheets

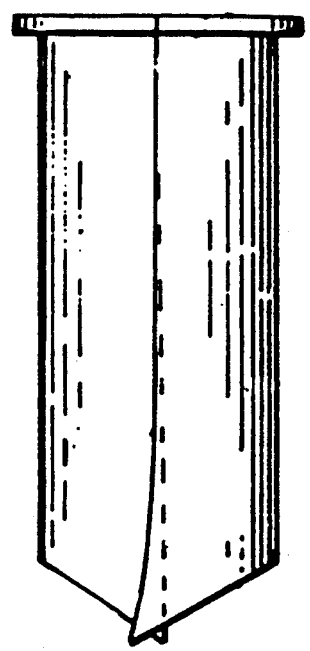
FIG 1
PRIOR ART
FIG 2
PRIOR ART
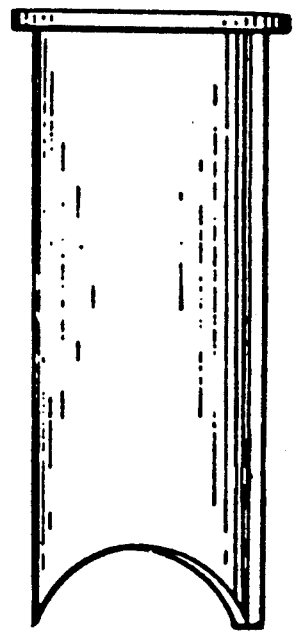

PLANT STEM PROTECTOR APPARATUS

BACKGROUND OF THE INVENTION

1. Field of the Invention

The field of invention relates to plant stem protector structure, and more particularly pertains to a new and improved plant stem protector apparatus wherein the same is arranged to afford protection and optional feeding of a plant positioned through the sleeve structure.

2. Description of the Prior Art

Plant protector apparatus has been utilized in the prior art and indicated in the U.S. Pat. No. 3,826,040 to Roberts having a sleeve with a slit and overlapping edges to receive a plant through the sleeve structure.

U.S. Pat. Nos. 4,357,884; 4,791,754; and 4,706,411 are further examples of plant protector structure.

Heretofore, however, the structure of the prior art has failed to address the ease of receiving and positioning a plant and in this respect, the present invention substantially fulfills this need in a manner to utilize structure oriented for ease of use as well as effectiveness in construction.

SUMMARY OF THE INVENTION

In view of the foregoing disadvantages inherent in the known types of plant stem protector structure now present in the prior art, the present invention provides a plant stem protector apparatus wherein the same is arranged to receive a plant into the structure upon opening of a slit by manually compressing radially displaced flanges relative to one another. As such, the general purpose of the present invention, which will be described subsequently in greater detail, is to provide a new and improved plant stem protector apparatus which has all the advantages of the prior art plant stem protector structure and none of the disadvantages.

To attain this, the present invention provides a plant stem protector including a tubular sleeve having a slit arranged parallel relative to an axis of the tubular sleeve, with the tubular sleeve further including first and second radial flanges projecting exteriorly of the sleeve fixedly mounted thereto to permit compressing of flanges towards one another to effect opening of the sleeve to permit a plant stem to be directed through the slit. A modification of the invention includes the sleeve having feed tubes mounted parallel relative to the axis of the slit to cooperate with a reservoir fluid fill structure to permit selective feeding of each plant relative to the stem structure of each plant when positioned within the sleeve structure.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved plant stem protector apparatus which has all the advantages of the prior art plant stem protector structure and none of the disadvantages.

It is another object of the present invention to provide a new and improved plant stem protector apparatus which may be easily and efficiently manufactured and marketed.

It is a further object of the present invention to provide a new and improved plant stem protector apparatus which is of a durable and reliable construction.

An even further object of the present invention is to provide a new and improved plant stem protector apparatus which is susceptible of a low cost of manufacture with regard to both materials and labor, and which accordingly is then susceptible of low prices of sale to the consuming public, thereby making such plant stem protector apparatus economically available to the buying public.

Still yet another object of the present invention is to provide a new and improved plant stem protector apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic view of a prior art plant stem protector tube.

FIG. 2 is a further orthographic view of the plant stem protector tube, as set forth in FIG. 1.

DESCRIPTION OF THE PREFERRED EMBODIMENT

Figure 3:
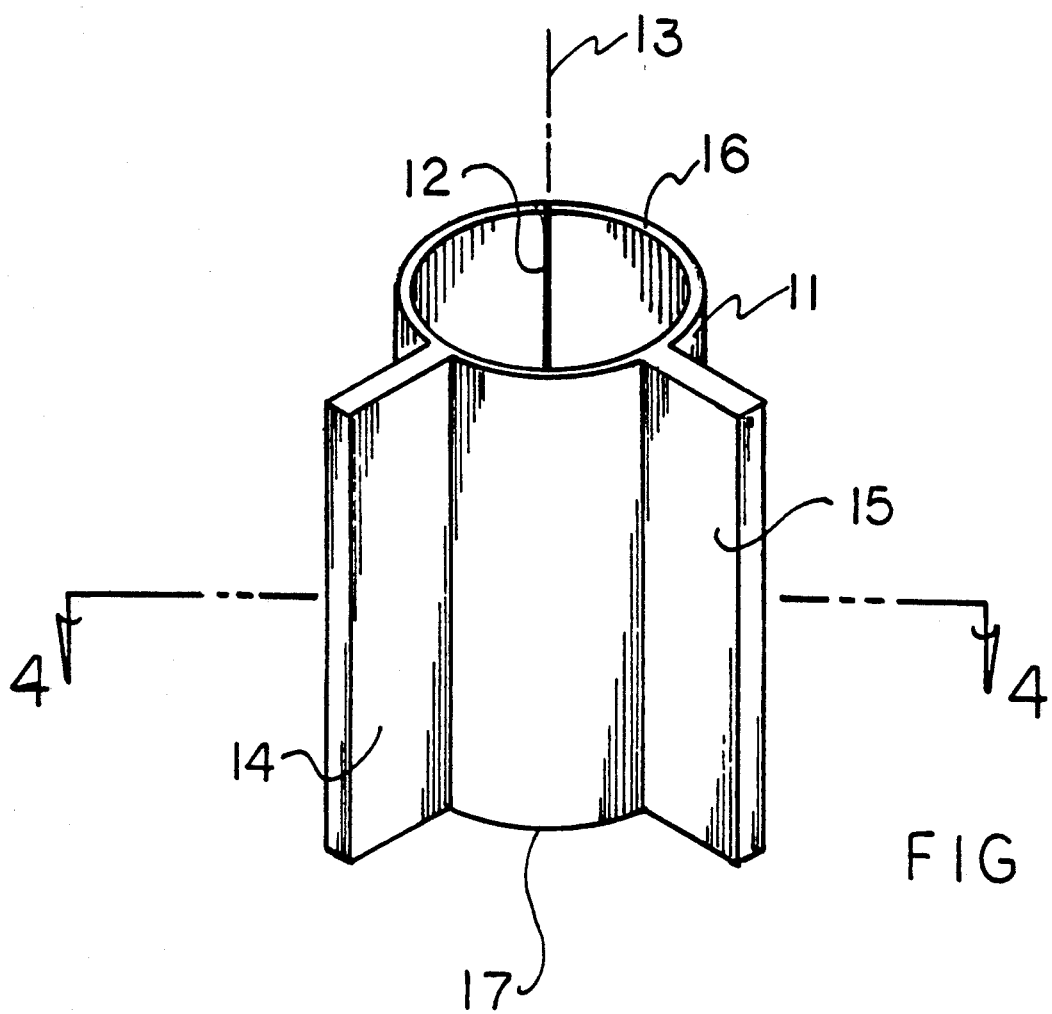
FIG. 3 is an isometric illustration of the instant invention.
Figure 4:
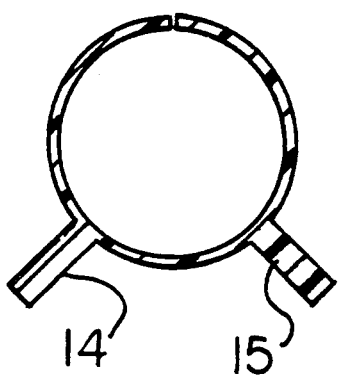
FIG. 4 is an orthographic view, taken along the lines 4—4 of FIG. 3 in the direction indicated by the arrows.

With reference now to the drawings, and in particular to FIGS. 1 to 9 thereof, a new and improved plant stem protector apparatus embodying the principles and concepts of the present invention and generally designated by the reference numeral 10 will be described.

FIGS. 1 and 2 illustrate a prior art plant stem protector sleeve structure, as indicated in the U.S. Pat. No. 3,826,040, having a sleeve and a slit to permit overlapping of longitudinal sides of the sleeve structure terminating in lower pointed ends.

More specifically, the plant stem protector apparatus 10 of the instant invention essentially comprises the use of a flexible tubular sleeve 11 formed of a shape retentent material, having a slit 12 directed through the sleeve wall oriented parallel relative to a sleeve axis 13. Respective first and second radial flanges 14 and 15 are integrally and fixedly mounted to an exterior surface of the sleeve 11 spaced apart and radially displaced thirty to one hundred degrees, and preferably defining an acute angle therebetween. The sleeve 11 includes a sleeve upper annular edge spaced from and parallel to a sleeve lower annular edge, with the flanges 14 and 15 orthogonally directed and coextensive between the upper and lower annular edges. In this manner, manual compressing of the flanges 14 and 15 together effects opening of the sleeve slit 12 to permit receiving a plant stem within the sleeve structure for affording protection to the stem of the plant.

Figure 5:
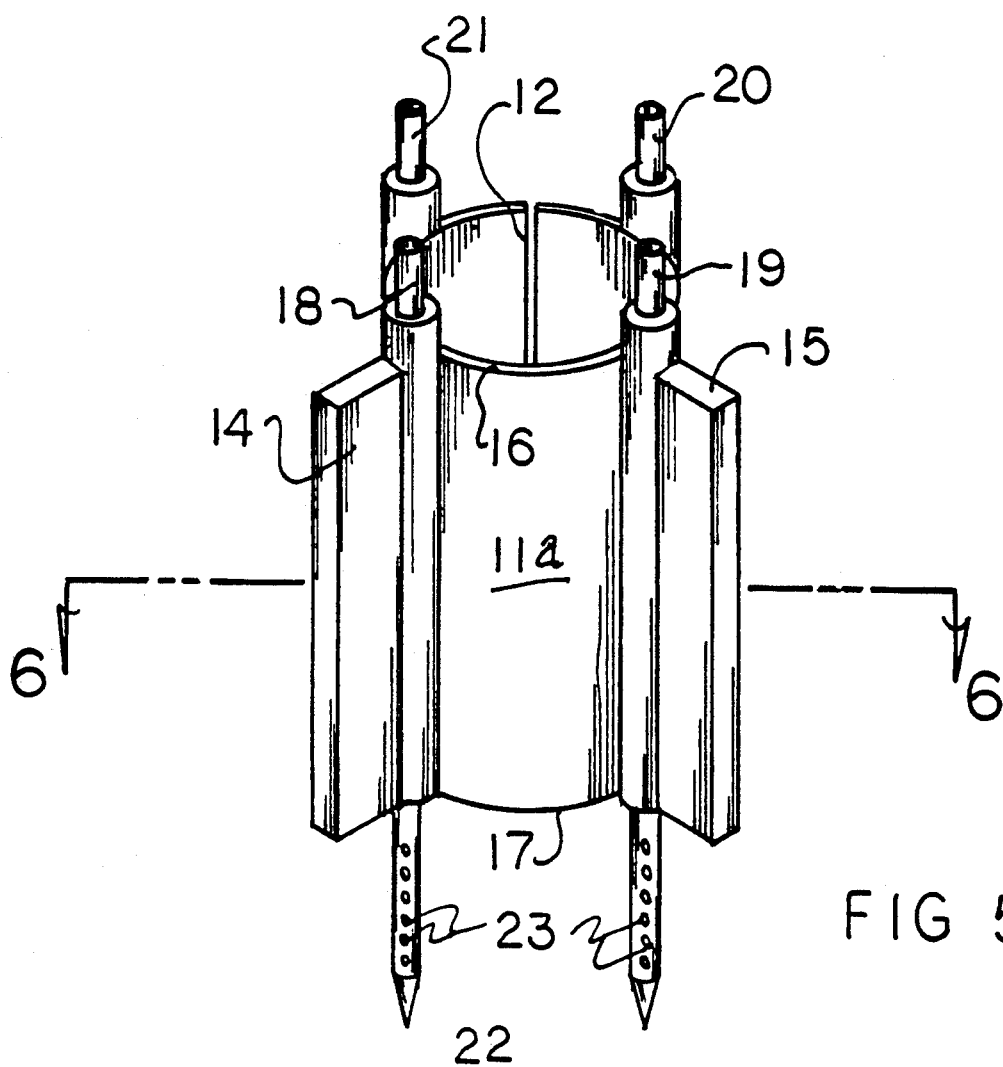
FIG. 5 is an isometric illustration of a modified aspect of the invention.
Figure 6:
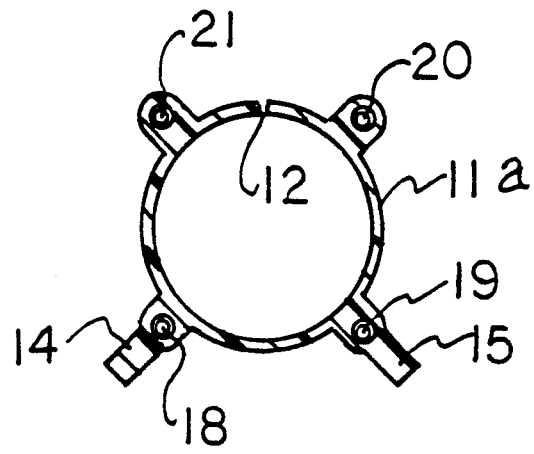
FIG. 6 is an orthographic view, taken along the lines 6—6 of FIG. 5 in the direction indicated by the arrows.
Figure 7:
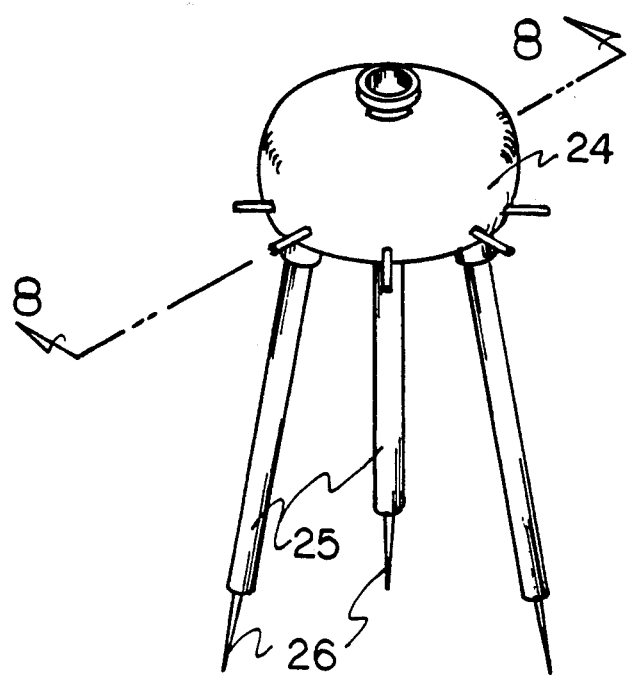
FIG. 7 is an isometric illustration of a reservoir structure utilized by the invention.
Figure 8:
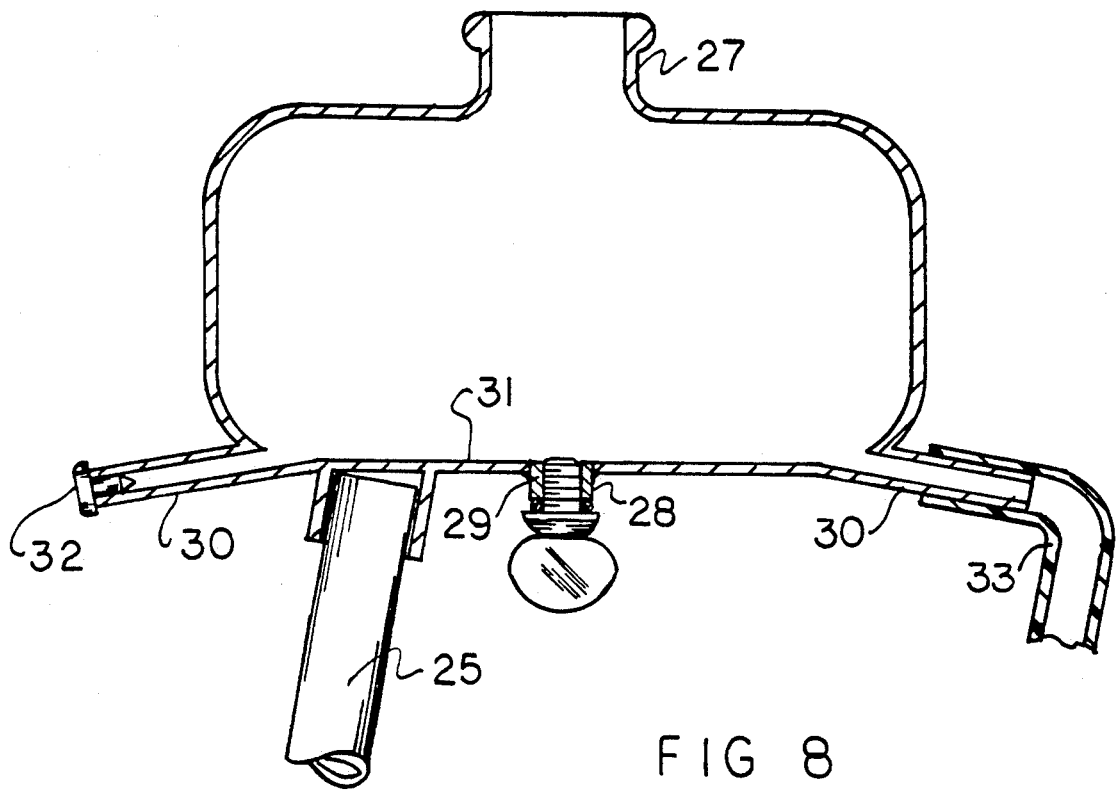
FIG. 8 is an orthographic view, taken along the lines 8—8 of FIG. 7 in the direction indicated by the arrows.
Figure 9:
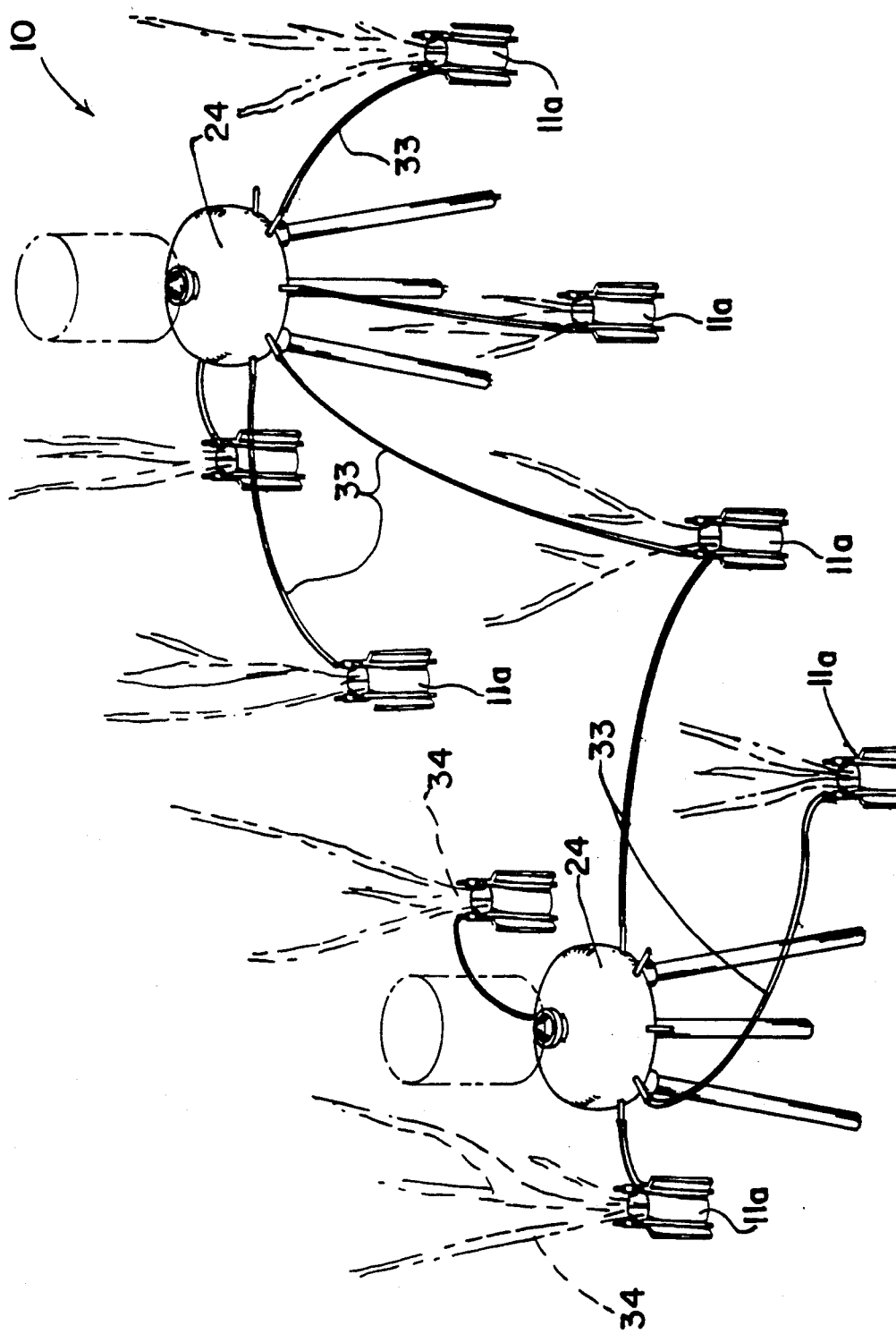
FIG. 9 is an isometric illustration of the modified aspect of the invention in use.

The FIG. 5 illustrates the use of a modified sleeve 11a further including first, second, third, and fourth parallel feed tubes 18, 19, 20, and 21 respectively fixedly mounted exteriorly of the sleeve 11 parallel to the axis 13. Each of the feed tubes includes a feed tube lower pointed end 22 to permit anchoring and positioning of the sleeve structure relative to a plant into an underlying support ground surface, with each of the feed tubes having a plurality of feed tube apertures 23 directed through the tubes between the feed tube lower pointed end 22 and the sleeve lower annular edge 17. A fluid reservoir 24 is provided having a reservoir floor 31, including a plurality of support legs 25 projecting downwardly from the floor, with use of the support legs including support leg projections 26 to permit engagement with an underlying ground surface. A fill conduit 27 is provided through a top wall of the reservoir to receive fluid containers in inverted configuration therethrough, in a manner as illustrated in FIG. 9. A drain conduit 28 is directed through the floor to permit selective drainage of the reservoir as desired. A drain plug 29 to this end is selectively secured within the drain conduit 28.

The reservoir 24 includes a plurality of delivery conduits 30, to include at least four such conduits, with each of the delivery conduits 30 positioned in adjacency relative to the fluid reservoir floor 31. Each of the delivery conduits 30 includes a removable delivery conduit plug 32, whereupon removal of the delivery conduit plug 32 permits mounting of a connector hose 33 thereto. The connector hose 33 is of flexible construction, wherein each connector hose 33 utilized is arranged to receive an upper end of one of said feed tubes 18-21 that project above the upper annular edge 16 of the modified feed structure 11a. In this manner, selective feeding about individuals plants 34 may be afforded, in a manner as illustrated in FIG. 9, to provide for directing fluid as well as fertilizer type structure and other nutrients in surrounding relationship relative to a plant stem of the associated plant 34.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A plant stem protector apparatus, comprising,
   a flexible tubular sleeve longitudinally aligned about a sleeve axis, with the tubular sleeve including a sleeve wall, and the sleeve wall including a slit directed through the sleeve parallel to the axis, and
   the sleeve wall including a sleeve wall first edge and a sleeve wall second edge arranged for coextensive and contiguous abutment relative to one another when the sleeve is in a first position and spaced apart relative to one another, in a second position, and
   the sleeve wall includes a first flange and a second flange, and an upper annular edge spaced from and parallel a lower annular edge, and the first flange and the second flange are fixedly mounted exteriorly of the sleeve wall parallel relative to one another and radially aligned relative to the axis, wherein the first flange and second flange are arranged for manual compression relative to one another to effect displacement of the first edge and the second edge of the slit to the second position, and
   the first flange and second flange are spaced apart thirty to one hundred degrees of arc, and
   the sleeve wall includes a plurality of feed tubes fixedly mounted to an exterior surface of the sleeve wall, each feed tube includes a feed tube upper end extending above the upper annular edge, and a feed tube lower end, the feed tube lower end terminating in a lower pointed projection, and a plurality of apertures directed through the feed tube between the sleeve lower annular edge and the projection.

2. An apparatus as set forth in claim 1, including a fluid reservoir, the fluid reservior including a reservoir floor and a reservoir top wall, with the reservoir floor including a plurality of support legs directed downwardly relative to the reservoir floor, with each support leg terminating in a support leg projection, and the reservoir top wall including a top wall fill conduit, and the floor including a drain conduit, the drain conduit including a drain conduit removable plug directed into the drain conduit, and the fluid reservoir further including a plurality of delivery conduits, at least one of said delivery conduits includes a delivery conduit plug removably mounted relative to the delivery conduit, and a further one of said delivery conduits includes a flexible connector hose, the flexible connector hose including a first end receiving the said at least one delivery conduit therewithin, and the connector hose including a connector hose second end receiving one of said feed tubes therewithin above the sleeve upper annular edge.

* * * * *